United States Patent [19]

Moore

[11] 4,230,348
[45] Oct. 28, 1980

[54] APPARATUS FOR SEALING FLANGE JOINTS

[75] Inventor: Vonnie S. Moore, Alvin, Tex.

[73] Assignee: Team Inc., Alvin, Tex.

[21] Appl. No.: 927,585

[22] Filed: Jul. 21, 1978

Related U.S. Application Data

[63] Continuation of Ser. No. 661,996, Feb. 27, 1976, abandoned.

[51] Int. Cl.$^2$ .............................................. F16L 13/00
[52] U.S. Cl. .................................. 285/297; 285/363; 285/15
[58] Field of Search ............... 285/284, 294, 297, 363, 285/15, 21, 22, 94, 178; 85/15 P; 251/340, 345, 352; 138/97; 156/305

[56] References Cited

U.S. PATENT DOCUMENTS

| | | | |
|---|---|---|---|
| 1,620,154 | 3/1927 | Furman | 285/294 |
| 1,946,619 | 2/1934 | Furman et al. | 85/15 P |
| 2,754,254 | 8/1956 | Soehnlen et al. | 285/294 X |
| 3,033,226 | 5/1962 | Allen | 251/345 X |
| 3,434,743 | 3/1969 | Boeker | 285/297 X |

FOREIGN PATENT DOCUMENTS

| | | | |
|---|---|---|---|
| 188708 | 11/1922 | United Kingdom | 85/15 P |
| 577029 | 5/1946 | United Kingdom | 285/284 |
| 629823 | 9/1949 | United Kingdom | 85/15 P |

*Primary Examiner*—Dave W. Arola
*Attorney, Agent, or Firm*—Guy E. Matthews

[57] ABSTRACT

In one exemplar embodiment, an injection ring is provided that fits tightly between a flange face and a locking nut. The ID of the ring is larger than the OD of a slotted flange stud for creating an annular space about the stud communicating with the slot in the flange stud. The annular space is closed at one end by the lock nut face. The other end of the annular space communicates with the space between the flange stud apertures and the screw teeth of the slotted stud. A radial opening or aperture through the injection ring communicates with the inner periphery of the ring and the annular space for permitting injection of a suitable sealant through the slotted stud into the flange joint.

1 Claim, 7 Drawing Figures

APPARATUS FOR SEALING FLANGE JOINTS

This is a continuation, of application Ser. No. 661,996 filed Feb. 27, 1976 and now abandoned.

BACKGROUND OF THE INVENTION

This invention relates to apparatus for flange joint sealing and, in particular, apparatus for sealing flange joints and annular spaces between flange studs and flange apertures.

The prior art has utilized numerous means to fill the annular space between a flange stud and pipeline flange joint with a suitable sealant to seal the joint and spaces against leaks due to stress on and warpage of the pipeline. Complex fittings and valved arrangements have been used in connection with special hollow or slotted flange studs to distribute and circulate the sealant.

Accordingly, one primary feature of the present invention is to provide an efficient ring or nut means in combination with a slotted flange stud for introducing a sealant to the stud slot and flange joint.

Another feature of the present invention is to provide an injection ring or nut in combination with a slotted flange stud that can easily be disposed between a flange face and a lock nut on the slotted flange stud.

Yet another feature of the present invention is to provide an injection ring or nut that can easily be closed after sealant has been injected.

SUMMARY OF THE INVENTION

The present invention remedies the problems of the prior art by providing an injection ring that may be disposed about a slotted stud and tightly held between a flange face and a locking nut. The ring has an ID larger than the OD of the slotted stud to provide an annular space between the stud and the ring for communicating with the slot of the stud. The annular aperture is closed at one end by the lock nut face. A radial aperture is disposed in the ring and communicates with its inner periphery and the annular space. Sealant may be injected through the radial aperture into the annular space and then through the slotted stud to the flange joint. The radial aperture may be closed by a set-screw or bolt.

In another embodiment, the present invention remedies the problems of the prior art by providing an injection nut disposed over the slotted stud and held tightly in place by the flange face and lock nut. The nut has a radial aperture therethrough communicating with its inner periphery and a semicircular groove or channel disposed in its inner periphery. Sealant may be introduced through the radial aperture and the semicircular groove into the slot of the flange stud for distribution to the flange joint. The radial aperture may be closed by a set screw or bolt, or the nut may be turned until the semicircular groove is no longer in communication with the slot of the flange stud.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments. In the drawings.

DETAILED DESCRIPTION OF THE PREFERRED EMBODIMENTS

Figure 1:
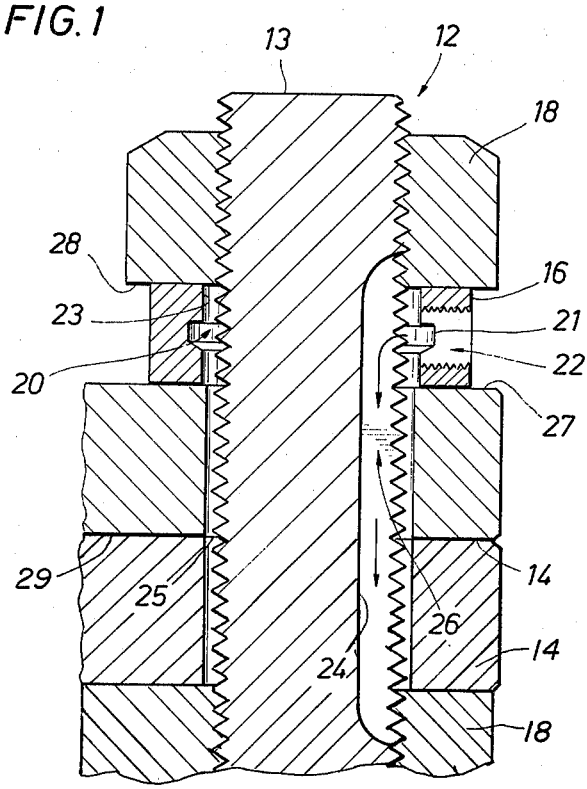
FIG. 1 is a vertical cross-sectional view of a flange, slotted stud, locking nut and the injection ring according to this invention.
Figure 2:
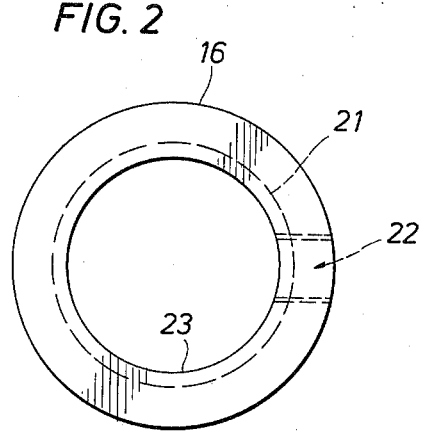
FIG. 2 is a top view of an injection ring according to this invention.
Figure 3:
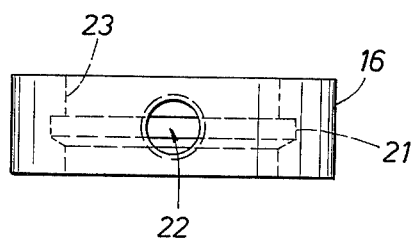
FIG. 3 is a side view of an injection ring according to this invention.
Figure 4:
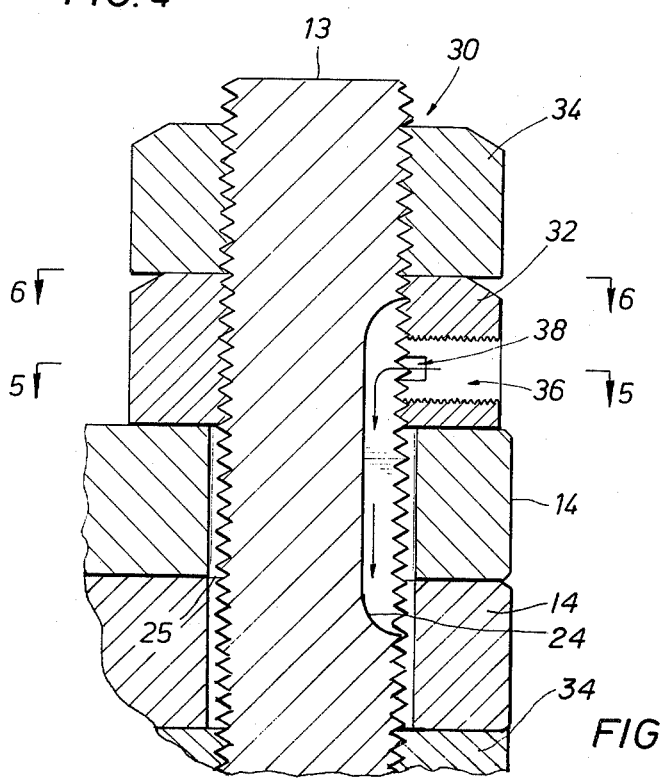
FIG. 4 is a vertical cross-sectional view of a flange, slotted stud, locking nut and the injection nut according to this invention.

Referring now to FIGS. 1, 2 and 3, an injection ring assembly 12 according to the present invention is shown. A slotted flange stud 13 is disposed through adjacent pipeline flanges 14 having a slot 24 disposed therein for forming a slot or channel 26 for conducting sealant to the pipe flange joint. Injection ring 16 is disposed over stud 13 and held tightly between surface 27 of flange 14 and lower surface 28 of lock nut 18. The ID 23 of ring 16 is larger than the OD of stud 13 to provide an annular space 20 therebetween that communicates with the slot 26 of stud 13. The annular space 20 is closed on one end by the lower surface 28 of lock nut 18 and partially closed on the other end by surface 27 of flange 14. However, the annular space 20 communicates with the narrow annular space 25 between the slotted stud screw threads and the flange stud apertures.

A threaded aperture 22 is radially disposed in injection ring 16 and communicates with annular space 20 for routing sealant to the annular space 20 and through slot 26. An annular groove 21 may be disposed centrally of the inner periphery of injection ring 16 for aiding circulation of sealant about the slotted nut 13 and thence through annular space 25 to seal the space between the stud 13 and flange 14 while the bulk of the sealant is routed through slot 26 to the flange joint interface (not shown). The flange joint occurs at the flange surface 29 which is secured by the bolts 13 in sealed assembly with a similar sealing surface of an adjacent pipe flange, not shown. Sealant injected into the pipe joint is forced through the channel 26 and also through the clearance 25 between the bolt threads and the flange aperture. The flanges are secured in assembly by a pair of nuts, such as at 18, and the opposite nut will provide a seal against an outer surface of the adjacent flange as the nut is threaded into tight engagement with the outer surface of the adjacent flange. The injected sealant will thus be forced to flow only into the flange joint to prevent leakage and will not leak from the channel or annular spaces at the stud apertures. The annulus between the bolt apertures in the flanges and the external threaded surface of the bolts or studs define cavities in registry with the sealed joint defined by the flange. Groove 21 may be particularly helpful if the ring 16 is off-center and one side of the inner periphery 23 of the ring is wedged against the threads of stud 13. After injection of sealant, the aperture 22 can be closed by a set screw or bolt (not shown).

Turning to FIGS. 4, 5, 6 and 7, an injection nut assembly 30 according to the present invention is shown. The injection nut 32 is disposed between flange 14 and locking nut 34. Nut 32 has a radial aperture 36 communicating with its inner periphery, and a semicircular groove or channel 38 located centrally of the inner periphery of nut 32 for communicating with slot 26 of slotted stud 13. The sealant may be injected through aperture 36 and semicircular groove 38 into slot 26 for distribution to the flange joint (not shown) and circulation in annular space 25 between the scew threads of stud 13 and the flange stud apertures.

Figure 5:
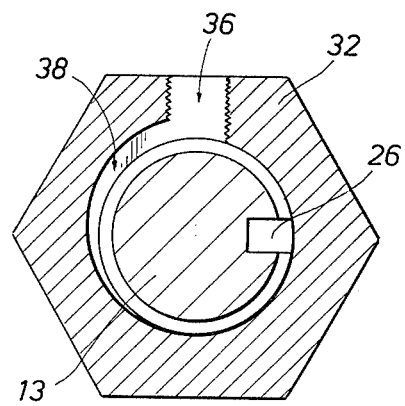
FIG. 5 is a horizontal cross-sectional view of the injection nut and flange stud taken along lines 5—5 of FIG. 4, with the semicircular channel in the nut turned so as not to communicate with the slot in the stud.
Figure 6:
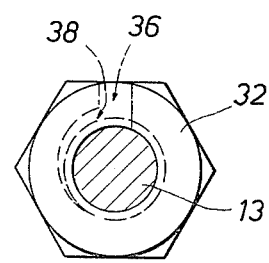
FIG. 6 is a horizontal cross-sectional view of the injection nut and flange stud taken along lines 6—6 of FIG. 4.
Figure 7:
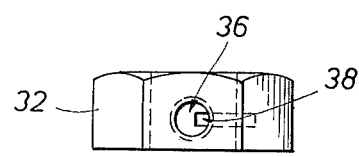
FIG. 7 is a side view of an injection nut according to this invention.

To close off the seal injection opening, aperture 36 may be closed by any suitable conventional means, such as a set screw or bolt. However, nut 32 may also be turned about stud 13 until apertures 36 and 38 are no longer in communication with slot 26 as shown in FIG. 5, and slot 26 will be effectively sealed. After turning nut 32, locking nut 34 may be tightened to hold injector nut 32 securely in place.

Numerous variations and modifications may obviously be made in the structure herein described without departing from the present invention. Accordingly, it should be clearly understood that the forms of the invention herein described and shown in the Figures of the accompanying drawings are illustrative only and are not intended to limit the scope of the inventions.

What is claimed is:

1. An assembly for use with flanged connections with circumferentially spaced matching apertures in the mating flanges for receiving bolts to connect the flanges for enabling repair of the connection if leaks occur therein without disassembly or further necessary work on the assembly, comprising:
    (a) at least one bolt mounted through an aperture in the flanges of the flanged connection, said bolt being formed to define an elongated slot intermediate the extremities thereof for extending into communication with the joint between the flanges of the flanged connection;
    (b) an injection ring positioned about an end of said bolt, said ring have a semicircular channel in the inner periphery thereof and a radially extending injection aperture extending through the ring and communicating with one end of said channel
    (c) lock nut means on said end of said bolt threadingly and sealingly connecting said injection ring on said bolt wherein said ring may be rotated relative to said bolt from an operative position where said slots are in registry with said semicircular channel to an inoperative position where said channel and said slots are out of registery and communication of said sealant between said slot in said bolts and said channel in said ring is prevented; and
    (d) a nut threadingly and sealingly engaging with a second end of said bolt for sealingly engaging with the outer surface of a flange of the flanged connection whereby threading said nut onto said bolt urges the assembly into sealing engagement and wherein said slot does not extend beyond said nut and lock nut means.

* * * * *